(12) United States Patent
Hiramatu et al.

(10) Patent No.: US 9,265,106 B2
(45) Date of Patent: Feb. 16, 2016

(54) LIGHTING DEVICE AND ILLUMINATION APPARATUS USING THE SAME

(71) Applicant: Panasonic Corporation, Osaka (JP)

(72) Inventors: Akinori Hiramatu, Nara (JP); Shigeru Ido, Osaka (JP); Junichi Hasegawa, Osaka (JP); Hiroshi Kido, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 35 days.

(21) Appl. No.: 14/457,413

(22) Filed: Aug. 12, 2014

(65) Prior Publication Data

US 2015/0054419 A1 Feb. 26, 2015

(30) Foreign Application Priority Data

Aug. 20, 2013 (JP) .................................. 2013-170665
Aug. 20, 2013 (JP) .................................. 2013-170666

(51) Int. Cl.
*H05B 37/02* (2006.01)
*H05B 33/08* (2006.01)

(52) U.S. Cl.
CPC ........ *H05B 33/0815* (2013.01); *H05B 33/0848* (2013.01)

(58) Field of Classification Search
CPC ............... H05B 37/02; H05B 33/0806; H05B 33/0815; H05B 33/0833; H05B 33/0842; H05B 33/0845; H05B 33/0848

USPC .......... 315/185 R, 209 R, 225, 226, 291, 293, 315/294, 307, 308

See application file for complete search history.

(56) References Cited

U.S. PATENT DOCUMENTS 7,825,612 B2 * 11/2010 Lee .................... H05B 33/0818
315/209 R

* cited by examiner

*Primary Examiner* — Jimmy Vu
(74) *Attorney, Agent, or Firm* — Renner, Otto, Boisselle & Sklar, LLP (57) ABSTRACT

In first mode, controller is configured, when receiving a dimming instruction signal, to control voltage-adjusting part to provide a DC voltage with a magnitude corresponding to a luminous level, across output ends of DC power supply, and apply a control voltage with a magnitude kept constant to a control terminal of switching element. In second mode, controller is configured, when receiving the dimming instruction signal, to apply the control voltage with a magnitude corresponding to luminous level to the control terminal of switching element, and control voltage-adjusting part to provide the DC voltage with a magnitude kept constant, across the output ends of DC power supply. Controller is configured to operate in one of first and second modes when luminous level is predetermined level or more, and in the other of first and second modes when luminous level is less than predetermined level.

10 Claims, 6 Drawing Sheets

LIGHTING DEVICE AND ILLUMINATION APPARATUS USING THE SAME

CROSS REFERENCE TO RELATED APPLICATIONS

This application claims the benefit of priority to Japanese Patent Application No. 2013-170665 filed on Aug. 20, 2013 and Japanese Patent Application No. 2013-170666 filed on Aug. 20, 2013, the entire contents of which are incorporated by reference herein.

TECHNICAL FIELD

The disclosure relates generally to lighting devices and illumination apparatuses using the same and, more particularly, to a lighting device, which has a dimming function, and an illumination apparatus using the same.

BACKGROUND ART

For example, JP2006-511078A (hereinafter, referred to as "document 1") discloses a supply assembly, which is configured to supply electric power to an LED (light emitting diode) module. This supply assembly includes: a series circuit of a diode and a control switch; and a controller. The series circuit is connected across both ends of a DC power supply. The controller is configured to output a dual PWM (Pulse Width Modulation) signal to the control switch. In addition, a series circuit of an inductor and the LED module is connected across both ends of the diode.

The controller includes a pulse width modulator, to which a current reference signal from a current source, a detection current and a high frequency saw-tooth-wave signal are input. The pulse width modulator is configured to output a high frequency PWM signal to one input part of an AND gate. To the other input part of the AND gate, a low frequency PWM signal is input. The AND gate is configured to output the dual PWM signal that is obtained by combination of the high frequency PWM signal and the low frequency PWM signal. The dual PWM signal is input to a gate of the control switch via an amplifier.

In this supply assembly, it is possible to change the intensity of light to be output from the LED module by changing a low frequency component of the dual PWM signal to be output from the controller to the control switch.

Incidentally, generally, a luminance of an LED is higher than that of an incandescent lamp or a fluorescent lamp. Therefore, if the LED is lighted by the same luminous flux as the incandescent lamp or the fluorescent lamp, a user may sense that the LED is brighter than the incandescent lamp or the fluorescent lamp. For this reason, it is required to reduce the luminous flux by suppressing a drive current for the LED, in order to make the apparent brightness of the LED agree with the brightness of the incandescent lamp or the fluorescent lamp.

In a case of an illumination apparatus including one or more LEDs in which a rated current is 350 [mA] for example, it is required to set a lower limit of the current to be equal to or less than several microamperes to several milliamperes. However, it is hard to perform minute current control as described above, in a so-called burst light method of controlling light so that a load current intermittently flows through the LED module, as the supply assembly in the above-mentioned document 1.

In addition, when fade-in control or fade-out control is performed to the LED, it is required to control the drive current for the LED over a wide range of a minute current value to a rated current value in order to smoothly change the brightness of the LED.

When the rated current for the LED is 350 [mA] for example, it is required to adjust the drive current in a range of 100 [μA] to 350 [mA], and accordingly, the drive current should be controlled by the resolution of about 1/1000. For this reason, it is hard to smoothly change the brightness of the LED in the case of the supply assembly in the above-mentioned document 1.

SUMMARY OF THE INVENTION

It is an object of the present technology to provide a lighting device, which can light a light emitting element at a deeper (lower) luminous level and can smoothly change brightness of the light emitting element over a wide range, and an illumination apparatus using the same.

A lighting device according to an aspect of the present invention includes a DC power supply, a switching element and a controller. The DC power supply includes a voltage-adjusting part that is configured to adjust a magnitude of a DC voltage. The DC power supply is configured to provide, across output ends thereof, the DC voltage adjusted by the voltage-adjusting part. The switching element is connected in series with at least one light emitting element across the output ends of the DC power supply. The switching element includes a control terminal, and is configured to adjust a current flowing through the at least one light emitting element according to a magnitude of a control voltage that is applied to the control terminal. The controller has a first mode and a second mode. The first mode is, when receiving a dimming instruction signal of setting a luminous level for the at least one light emitting element, of controlling the voltage-adjusting part to provide the DC voltage with a magnitude that corresponds to the luminous level, across the output ends of the DC power supply. Further, the first mode is, when receiving the dimming instruction signal, of applying the control voltage with a magnitude that is kept constant to the control terminal of the switching element. The second mode is, when receiving the dimming instruction signal, of applying the control voltage with a magnitude that corresponds to the luminous level to the control terminal of the switching element. Further, the second mode is, when receiving the dimming instruction signal, controlling the voltage-adjusting part to provide the DC voltage with a magnitude that is kept constant, across the output ends of the DC power supply. The controller is configured to operate in one of the first and second modes, when the luminous level is a predetermined level or more. The controller is configured to operate in the other of the first and second modes, when the luminous level is less than the predetermined level.

An illumination apparatus according to an aspect of the present invention includes the above-mentioned lighting device and a light-emitting part including the at least one light emitting element. The light-emitting part is lighted by electric power supplied from the lighting device.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

Hereinafter, embodiments for a lighting device and an illumination apparatus using the same will be described with reference to drawings.

First Embodiment

Figure 1:
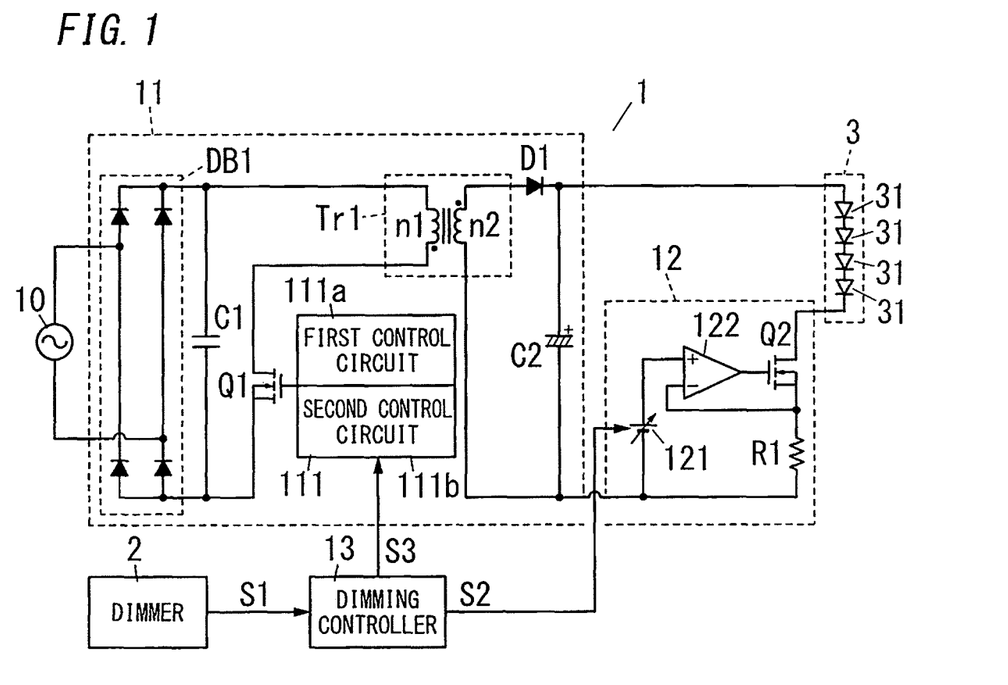
FIG. 1 is a circuit diagram illustrating one example of a lighting device according to First Embodiment.

FIG. 1 is a circuit diagram illustrating one example of a lighting device 1 according to the present embodiment. This lighting device 1 includes a DC power supply 11, a current-adjusting part 12, and a dimming controller 13. The lighting device 1 is configured to light a light-emitting part 3 at a luminous level according to a dimming signal S1 (dimming instruction signal) that is output from a dimmer 2.

The light-emitting part 3 includes a plurality of LEDs 31 (light emitting elements) that are connected in series (four LEDs in FIG. 1). The light-emitting part 3 is connected across output ends of the DC power supply 11, via a transistor Q2 (switching element) and a resistor R1. The number of the LEDs 31 constituting the light-emitting part 3 may be one, two, three, five or more. The light-emitting part 3 may be constituted by the LEDs 31 connected in parallel.

The DC power supply 11 is connected to an AC power source 10, and is configured to convert, into a DC voltage, an AC voltage supplied from the AC power source 10. The DC power supply 11 includes a so-called diode bridge DB1 that is constituted by four diodes, and a smoothing capacitor C1 is connected across output ends of the diode bridge DB1. In the DC power supply 11, a series circuit, which is constituted by a transistor Q1 and a primary winding n1 of a transformer Tr1, is connected across the output ends of the diode bridge DB1. Further, in the DC power supply 11, a diode D1 is connected to one end of a secondary winding n2 of the transformer Tr1, and a smoothing capacitor C2 is connected across both ends of the secondary winding n2.

In the DC power supply 11 according to the present embodiment, an N-channel type MOSFET is used as the transistor Q1, and a drive circuit 111 is connected to a gate terminal of the transistor Q1. In this DC power supply 11, a DC voltage generated across both ends of the smoothing capacitor C2 is an output voltage of the DC power supply 11.

The drive circuit 111 is a circuit for controlling on/off switching of the transistor Q1, and includes a first control circuit 111a that is configured to control an amplitude of an output current (that is, a current flowing through the light-emitting part 3), and a second control circuit 111b that is configured to control a ratio of a time period of outputting the current to a time period of not outputting the current. The first control circuit 111a is configured to set a duty ratio of the transistor Q1 according to a control signal S3 output from the dimming controller 13 to control the amplitude of the output current. The second control circuit 111b is configured to set a suspension period for suspending PWM (Pulse Width Modulation) control.

The current-adjusting part 12 includes a DC voltage source 121, which is capable of changing an output voltage thereof according to a control signal S2 output from the dimming controller 13. A positive electrode of the DC voltage source 121 is connected to a non-inverted input terminal of an operational amplifier 122. A negative electrode of the DC voltage source 121 is connected to a negative electrode of the DC power supply 11. A connecting point of the transistor Q2 and the resistor R1 is connected to an inverted input terminal of the operational amplifier 122. An output terminal of the operational amplifier 122 is connected to a gate terminal (control terminal) of the transistor Q2.

Here, in the present embodiment, an N-channel type MOSFET is used as the transistor Q2. In the transistor Q2, its impedance is changed according to the magnitude of a voltage output from the operational amplifier 122, and accordingly it is possible to adjust the magnitude of the current that flows through the light-emitting part 3.

When receiving the dimming signal S1 from the dimmer 2, the dimming controller 13 generates the control signals S2 and S3 that correspond to the dimming signal 51, and then outputs the control signal S2 to the current-adjusting part 12, and outputs the control signal S3 to the drive circuit 111. The dimming signal 51 is a signal denoting the magnitude of a load current that is made to flow through the light-emitting part 3, namely, brightness of the light-emitting part 3. In the present embodiment, the current-adjusting part 12 and the dimming controller 13 serves as a controller, and the drive circuit 111 serves as a voltage-adjusting part.

Next, operation of the lighting device 1 will be described with reference to FIGS. 2 to 4.

Figure 2:
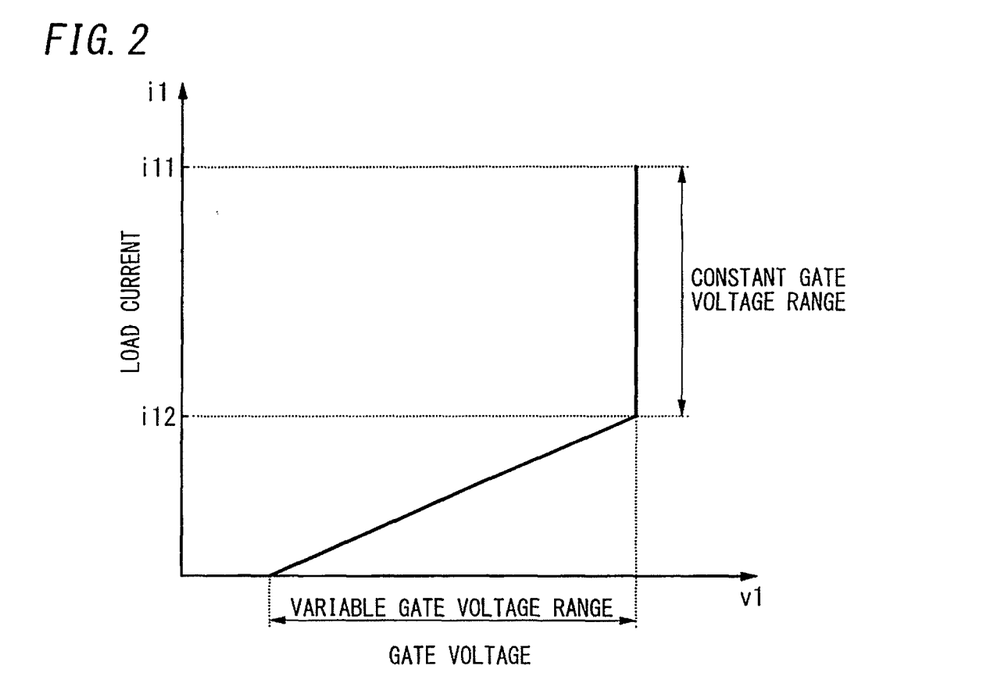
FIG. 2 is a graph illustrating a relationship between a gate voltage and a load current in the lighting device according to the First Embodiment.

FIG. 2 is a graph illustrating a relationship between a gate voltage v1 of the transistor Q2 in the current-adjusting part 12 and a load current i1 flowing through the light-emitting part 3. From this graph, it can be seen that the gate voltage v1 is reduced with a reduction of the load current i1 in a range where a value of the load current i1 is less than "i12", and the gate voltage v1 is kept constant in a range where a value of the load current i1 is equal to or more than "i12".

Figure 3:
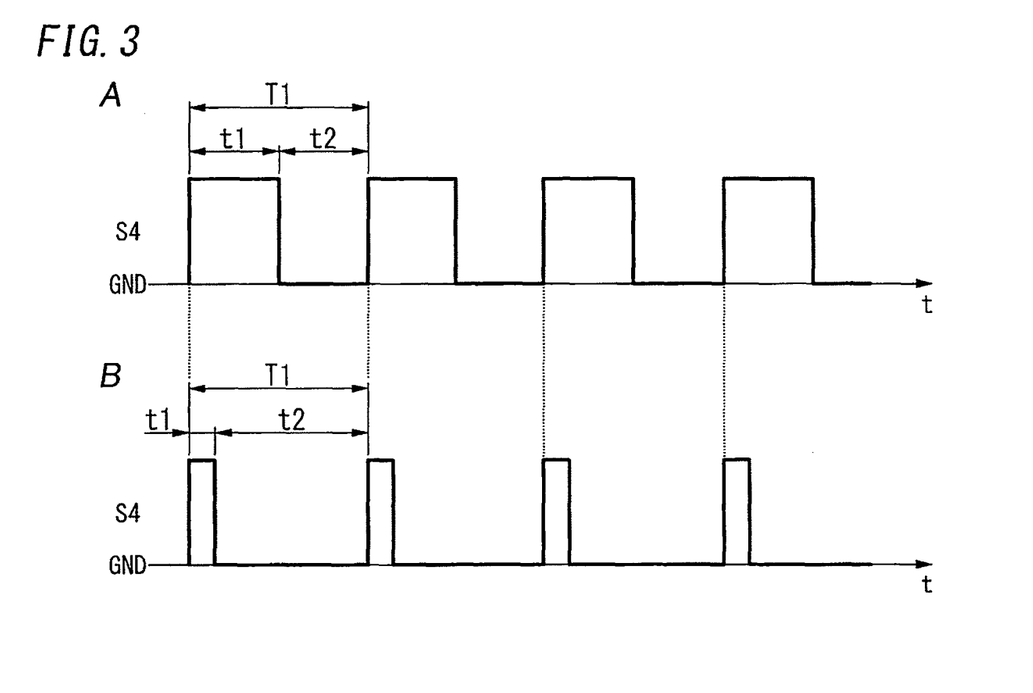
FIG. 3 is an explanatory drawing for operation of the lighting device according to the First Embodiment.
Figure 4:
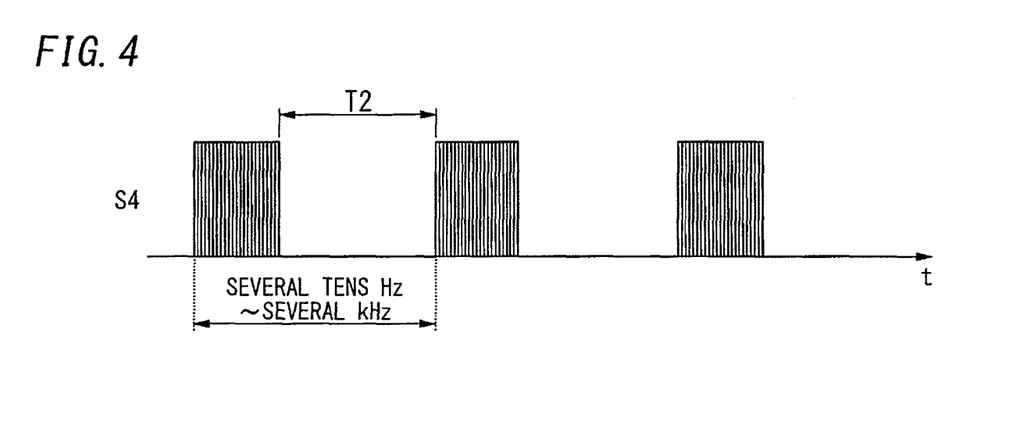
FIG. 4 is an explanatory drawing for another operation of the lighting device according to the First Embodiment.

Each of A and B in FIG. 3 shows a gate signal S4 sent to the transistor Q1 while dimming control is performed with the first control circuit 111a. When a value of the load current i1 is "i11", as shown in A of FIG. 3, a duty ratio (t1/T1) of the gate signal S4 is large. When a value of the load current i1 is "i12" (<i11), as shown in B of FIG. 3, a duty ratio (t1/T1) of the gate signal S4 is small. In this way, it is possible to change the brightness of the light-emitting part 3 by changing the duty ratio in the gate signal S4 according to the magnitude of the load current i1. In the drawing, a time period t1 and a time period t2 denote an ON-period and an OFF-period, respectively, and a time period T1 denotes the sum of the time periods t1 and t2.

When the luminous level according to the dimming signal S1 output from the dimmer 2 agrees with a full-lighting level, the output voltage of the DC power supply 11 is set to a rated voltage for the light-emitting part 3, and accordingly, a value of the load current i1 flowing through the light-emitting part 3 becomes "i11", and the light-emitting part 3 is fully lighted.

From this state, when a user operates the dimmer 2 to dim the light-emitting part 3, the luminous level according to the dimming signal 51 output from the dimmer 2 becomes low. When receiving the dimming signal S1 from the dimmer 2, the dimming controller 13 generates the control signal S3 for reducing the load current i1, and outputs the control signal S3 to the drive circuit 111. At this time, the control signal S2 output to the current-adjusting part 12 is constant, and accordingly, the gate voltage v1 output from the current-adjusting part 12 becomes constant.

When the drive circuit 111 receives the control signal S3 from the dimming controller 13, the first control circuit 111a reduces the duty ratio of the transistor Q1 according to the control signal S3. Accordingly, the load current i1 becomes less, and therefore, the brightness of the light-emitting part 3 becomes decreased. The above-mentioned operation is performed within the range where a value of the load current i1 is equal to or more than "i12" and less than "i11".

Next, when the user operates the dimmer 2 to more dim the light-emitting part 3, the luminous level according to the dimming signal 51 output from the dimmer 2 becomes lower. When receiving the dimming signal S1 from the dimmer 2, the dimming controller 13 outputs the control signal S3 to the drive circuit 111. However, in this case, the dimming controller 13 outputs the control signal S3 of making a value of the load current i1 agree with "i12". The dimming controller 13 further generates the control signal S2 of reducing the gate voltage v1 of the transistor Q2, and outputs the control signal S2 to the current-adjusting part 12.

When receiving the control signal S2 from the dimming controller 13, the current-adjusting part 12 adjusts the DC voltage source 121 so that an output voltage thereof agrees with a value of the gate voltage v1 according to this control signal S2. Accordingly, the load current i1 flowing through the light-emitting part 3 becomes less, and therefore, the brightness of the light-emitting part 3 becomes decreased more. Here, in the present embodiment, the luminous level when a value of the load current i1 is "i12" is defined as a predetermined level. This predetermined level is a lower limit of the luminous level, and the lower limit is set by the first control circuit 111a.

As above, when the luminous level is equal to or more than the predetermined level, the lighting device 1 performs the dimming control with the DC power supply 11. When the luminous level is less than the predetermined level, the lighting device 1 performs the dimming control with the current-adjusting part 12 in addition to the dimming control with the DC power supply 11, namely, combination of two dimming controls. Therefore, it is possible to light the LEDs 31 at a deeper (lower) luminous level and smoothly change brightness of the LEDs 31 over a wide range.

Figure 5A:
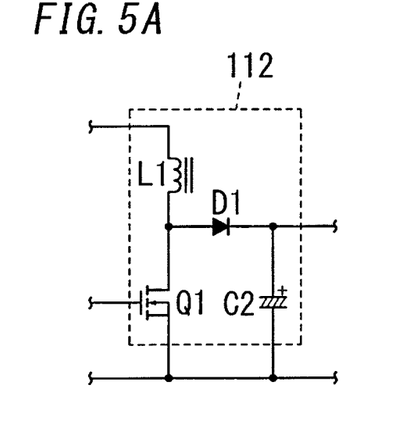
FIGS. 5A to 5D are circuit diagrams partly illustrating a DC power supply used for the lighting device according to the First Embodiment.

In the present embodiment, the output voltage of the diode bridge DB1 is stepped down by a flyback converter using the transformer Tr1 to be applied to the light-emitting part 3. However, instead of the flyback converter, a boosting chopper circuit 112 may be used as shown in FIG. 5A.

Figure 5B:
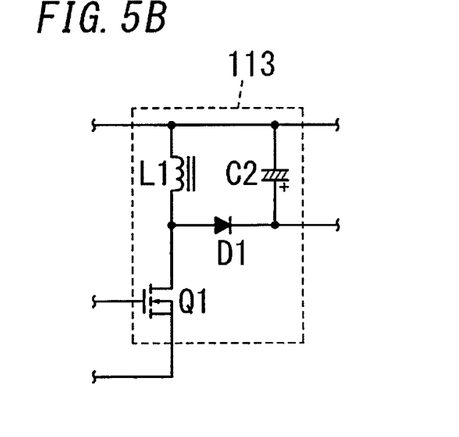
Figure 5C:
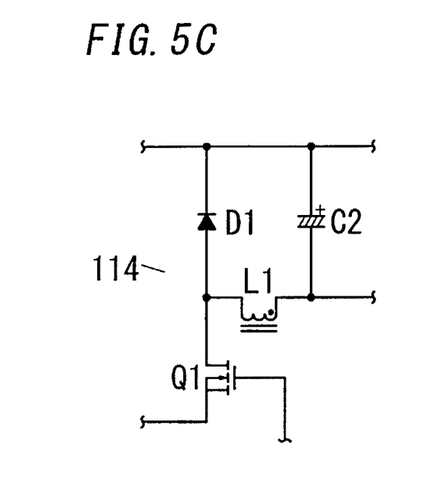
Figure 5D:
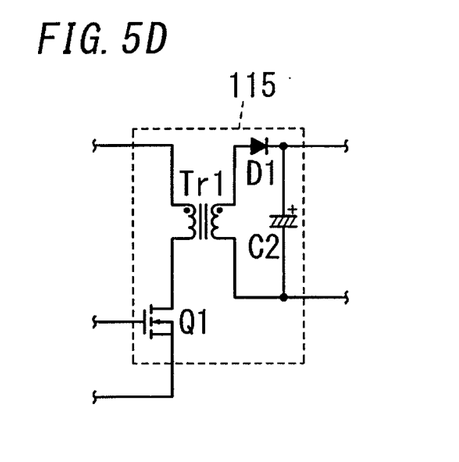

Alternatively, instead of the flyback converter, a boosting/step-down chopper circuit 113 may be used as shown in FIG. 5B, a step-down chopper circuit 114 may be used as shown in FIG. 5C, or a forward converter circuit 115 may be used as shown in FIG. 5D, for example. In any case, the same effect can be obtained by providing the current-adjusting part 12 between the light-emitting part 3 and such a circuit.

In the present embodiment, the dimming control is performed with the first control circuit 111a in the range where the load current i1 is equal to or more than "i12" and less than "i11". However, the dimming control may be performed with the second control circuit 111b. FIG. 4 shows the gate signal S4 sent to the transistor Q1 while the dimming control is performed with the second control circuit 111b. In this case, the burst frequency is set to be in a range of several tens Hz to several tens kHz. It is possible to adjust the luminous level for the light-emitting part 3 by changing a suspension period T2 (time period of not outputting a current) for suspending the PWM control.

In the present embodiment, the case where the LED is used as the light emitting element is described, but the light emitting element is not limited to the LED. For example, an organic EL element or a laser diode (LD) may be used as the light emitting element. In the present embodiment, the case is described as one example where the DC power supply 11 includes both of the first control circuit 111a and the second control circuit 111b. However, the DC power supply 11 is not limited to the configuration as the present embodiment. The DC power supply 11 may include at least one of the first control circuit 111a and the second control circuit 111b.

As described above, the lighting device 1 according to the present embodiment includes the DC power supply 11, the transistor Q2 (switching element) and the controller (current-adjusting part 12 and dimming controller 13). The DC power supply 11 includes the drive circuit 111 (voltage-adjusting part) that is configured to adjust the magnitude of the DC voltage. The DC power supply 11 is configured to provide, across the output ends thereof, the DC voltage adjusted by the drive circuit 111. The transistor Q2 is connected in series with the LEDs 31 (at least one light emitting element) across the output ends of the DC power supply 11. The transistor Q2 includes the gate terminal (control terminal), and is configured to adjust the current flowing through the LEDs 31 according to the magnitude of the control voltage that is applied to the gate terminal. The controller has the first mode and the second mode. The first mode is, when receiving the dimming instruction signal of setting the luminous level for the LEDs 31, of controlling the drive circuit 111 to provide the DC voltage with the magnitude that corresponds to the luminous level, across the output ends of the DC power supply 11. Further, the first mode is, when receiving the dimming instruction signal, of applying the control voltage with the magnitude that is kept constant to the gate terminal of the transistor Q2. The second mode is, when receiving the dimming instruction signal, of applying the control voltage with the magnitude that corresponds to the luminous level to the gate terminal of the transistor Q2. Further, the second mode is, when receiving the dimming instruction signal, controlling the drive circuit 111 to provide the DC voltage with the magnitude that is kept constant, across the output ends of the DC power supply 11. The controller is configured to operate in one of the first and second modes, when the luminous level is the predetermined level or more. The controller is configured to operate in the other of the first and second modes, when the luminous level is less than the predetermined level.

Preferably, as the above-mentioned lighting device 1 according to the present embodiment, the drive circuit 111 includes at least one of the first control circuit 111a and the second control circuit 111b. The first control circuit 111a is configured to control the amplitude of the current flowing through the LEDs 31. The second control circuit 111b is configured to control the ratio of the time period of outputting the current to the time period of not outputting the current. The controller includes the current-adjusting part 12 that is configured to adjust the current by changing the magnitude of the control voltage to be applied to the gate terminal of the transistor Q2. The controller is configured, when the luminous level is equal to or more than the predetermined level, to control at least one of the first and second control circuits 111a and 111b to provide the DC voltage with the magnitude that corresponds to the luminous level, across the output ends of the DC power supply 11, in the first mode. Further, the controller is configured, when the luminous level is equal to or more than the predetermined level, to control the current-adjusting part 12 to apply the control voltage with the magnitude that is kept constant to the gate terminal of the transistor Q2, in the first mode. On the other hand, the controller is configured, when the luminous level is less than the predetermined level, to control the current-adjusting part 12 to apply the control voltage with the magnitude that corresponds to the luminous level to the gate terminal of the transistor Q2, in the second mode. Further, the controller is configured, when the luminous level is less than the predetermined level, to control at least one of the first and second control circuits 111a and 111b to provide the DC voltage with the magnitude that is kept constant, across the output ends of the DC power supply 11, in the second mode.

Preferably, as the above-mentioned lighting device 1 according to the present embodiment, the predetermined level is the lower limit of the luminous level, and the lower limit is set by the first control circuit 111a.

Second Embodiment

A lighting device 1 according to the present embodiment will be described with reference to FIG. 6. Because circuit configuration of the lighting device 1 is similar to that of the First Embodiment, explanation thereof will be basically omitted here and described with reference to FIG. 1 if necessary.

As shown in FIG. 1, the lighting device 1 according to the present embodiment includes a DC power supply 11, a current-adjusting part 12 and a dimming controller 13. The lighting device 1 is configured to light a light-emitting part 3 at a luminous level according to a dimming signal S1 that is output from a dimmer 2.

Next, operation of the lighting device 1 will be described with reference to FIGS. 3, 4 and 6.

Figure 6:
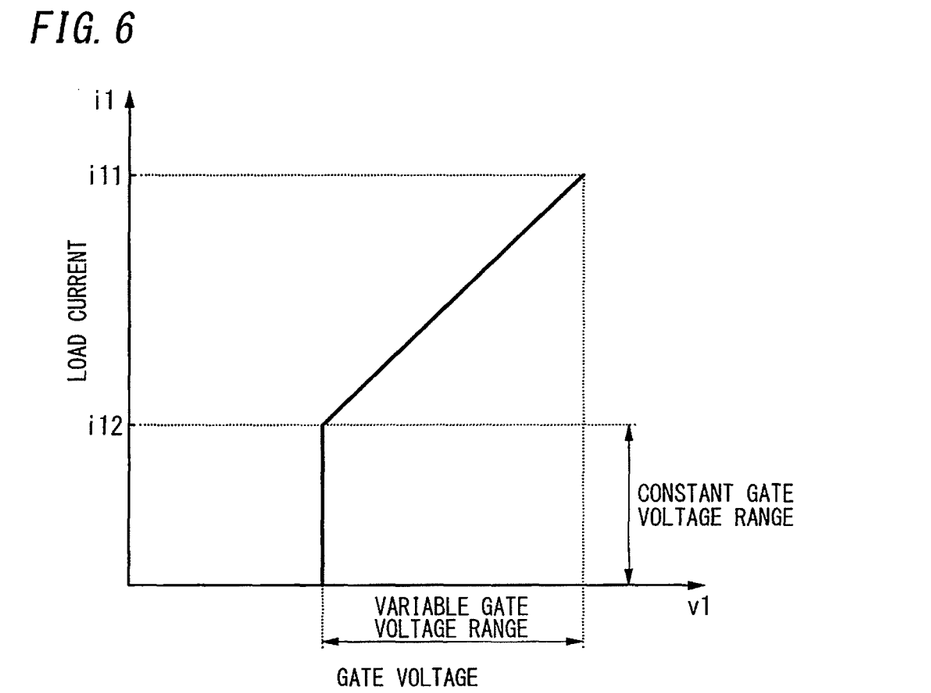
FIG. 6 is a graph illustrating a relationship between a gate voltage and a load current in a lighting device according to Second Embodiment.

FIG. 6 is a graph illustrating a relationship between a gate voltage v1 of a transistor Q2 in the current-adjusting part 12 and a load current i1 flowing through the light-emitting part 3. From this graph, it can be seen that the gate voltage v1 is reduced with a reduction of the load current i1 in a range where a value of the load current i1 is equal to or more than "i12", and the gate voltage v1 is kept constant in a range where a value of the load current i1 is less than "i12".

Each of A and B in FIG. 3 shows a gate signal S4 sent to a transistor Q1 while dimming control is performed with a first control circuit 111a. When the load current i1 is large, as shown in A of FIG. 3, a duty ratio (t1/T1) of the gate signal S4 is large. When the load current i1 is small, as shown in B of FIG. 3, a duty ratio (t1/T1) of the gate signal S4 is small. In this way, it is possible to change the brightness of the light-emitting part 3 by changing the duty ratio in the gate signal S4 according to the magnitude of the load current i1.

When the luminous level according to the dimming signal S1 output from the dimmer 2 agrees with a full-lighting level, the output voltage of the DC power supply 11 is set to a rated voltage for the light-emitting part 3, and accordingly, a value of the load current i1 flowing through the light-emitting part 3 becomes "i11", and the light-emitting part 3 is fully lighted.

From this state, when a user operates the dimmer 2 to dim the light-emitting part 3, the luminous level according to the dimming signal S1 output from the dimmer 2 becomes low. When receiving the dimming signal S1 from the dimmer 2, the dimming controller 13 generates a control signal S2 for reducing the gate voltage v1 of the transistor Q2, and outputs the control signal S2 to the current-adjusting part 12. In a range where a value of the load current i1 is equal to or more than "i12" and less than "i11", a control signal S3 that is output to the DC power supply 11 is set to be equal to the control signal S3 upon the full-lighting.

When receiving the control signal S2 from the dimming controller 13, the current-adjusting part 12 adjusts the DC voltage source 121 so that an output voltage thereof agrees with a value of the gate voltage v1 according to the control signal S2. Accordingly, the load current i1 flowing through the light-emitting part 3 becomes less, and therefore, the brightness of the light-emitting part 3 becomes decreased. The above-mentioned operation is performed within the range where a value of the load current i1 is equal to or more than "i12" and less than "i11".

Next, when the user operates the dimmer 2 to more dim the light-emitting part 3, the luminous level according to the dimming signal S1 output from the dimmer 2 becomes lower. When receiving the dimming signal S1 from the dimmer 2, the dimming controller 13 outputs the control signal S2 to the current-adjusting part 12. However, in this case, the dimming controller 13 outputs the control signal S2 of making a value of the load current i1 agree with "i12". Therefore, as shown in FIG. 6, the gate voltage v1 become constant. The dimming controller 13 further generates the control signal S3 of reducing the load current i1, and outputs the control signal S3 to a drive circuit 111.

When the drive circuit 111 receives the control signal S3 from the dimming controller 13, the first control circuit 111a reduces the duty ratio of the transistor Q1 according to the control signal S3. Accordingly, the load current i1 becomes less, and therefore, the brightness of the light-emitting part 3 becomes decreased more. Here, in the present embodiment, the luminous level when a value of the load current i1 is "i12" is defined as a predetermined level.

As above, when the luminous level is equal to or more than the predetermined level, the lighting device 1 performs the dimming control with the current-adjusting part 12. When the luminous level is less than the predetermined level, the lighting device 1 performs the dimming control with the DC power supply 11 in addition to the dimming control with the current-adjusting part 12, namely, combination of two dimming controls. Therefore, it is possible to light the LEDs 31 at a deeper (lower) luminous level and smoothly change brightness of the LEDs 31 over a wide range.

In the present embodiment, the dimming control is performed with the first control circuit 111a in the range where the load current i1 is equal to or more than "i12" and less than "i11". However, the dimming control may be performed with the second control circuit 111b. FIG. 4 shows the gate signal S4 sent to the transistor Q1 while the dimming control is performed with the second control circuit 111b. In this case, the burst frequency is set to be in a range of several tens Hz to several tens kHz. It is possible to adjust the luminous level for the light-emitting part 3 by changing a suspension period T2 (time period of not outputting a current) for suspending the PWM control.

Also in the present embodiment, instead of a flyback converter using a transformer Tr1, any one of circuits shown in FIGS. 5A to 5D may be used. In any case, the same effect can be obtained by providing the current-adjusting part 12 between the light-emitting part 3 and such a circuit. Further, also in the present embodiment, the light emitting element is not limited to the LED. For example, an organic EL element or a laser diode (LD) may be used as the light emitting element.

Also in the present embodiment, the case is described as one example where the DC power supply 11 includes both of the first control circuit 111a and the second control circuit 111b. However, the DC power supply 11 is not limited to the configuration as the present embodiment. The DC power supply 11 may include at least one of the first control circuit 111a and the second control circuit 111b.

Preferably, as the above-mentioned lighting device 1 according to the present embodiment, the drive circuit 111 (voltage-adjusting part) includes at least one of the first control circuit 111a and the second control circuit 111b. The first control circuit 111a is configured to control the amplitude of the current flowing through the LEDs 31. The second control circuit 111b is configured to control the ratio of the time period of outputting the current to the time period of not outputting the current. The controller includes the current-adjusting part 12 that is configured to adjust the current by changing the magnitude of the control voltage to be applied to the gate terminal of the transistor Q2. The controller is configured, when the luminous level is equal to or more than the predetermined level, to control the current-adjusting part 12 to apply the control voltage with the magnitude that corresponds to the luminous level to the gate terminal of the transistor Q2, in the second mode. Further, the controller is configured, when the luminous level is equal to or more than the predetermined level, to control at least one of the first and second control circuits 111a and 111b to provide the DC voltage with the magnitude that is kept constant, across the output ends of the DC power supply 11, in the second mode. On the other hand, the controller is configured, when the luminous level is less than the predetermined level, to control at least one of the first and second control circuits 111a and 111b to provide the DC voltage with the magnitude that corresponds to the luminous level, across the output ends of the DC power supply 11, in the first mode. Further, the controller is configured, when the luminous level is less than the predetermined level, to control the current-adjusting part 12 to apply the control voltage with the magnitude that is kept constant to the gate terminal of the transistor Q2, in the first mode.

Third Embodiment

A lighting device 1 according to the present embodiment will be described with reference to FIGS. 7 to 9. Because circuit configuration of the lighting device 1 is similar to that of the First Embodiment, explanation thereof will be basically omitted here and described with reference to FIG. 1 if necessary.

As shown in FIG. 1, the lighting device 1 according to the present embodiment includes a DC power supply 11, a current-adjusting part 12 and a dimming controller 13. The lighting device 1 is configured to light a light-emitting part 3 at a luminous level according to a dimming signal S1 that is output from a dimmer 2.

Next, operation of the lighting device 1 will be described with reference to FIGS. 7 to 9.

Figure 7:
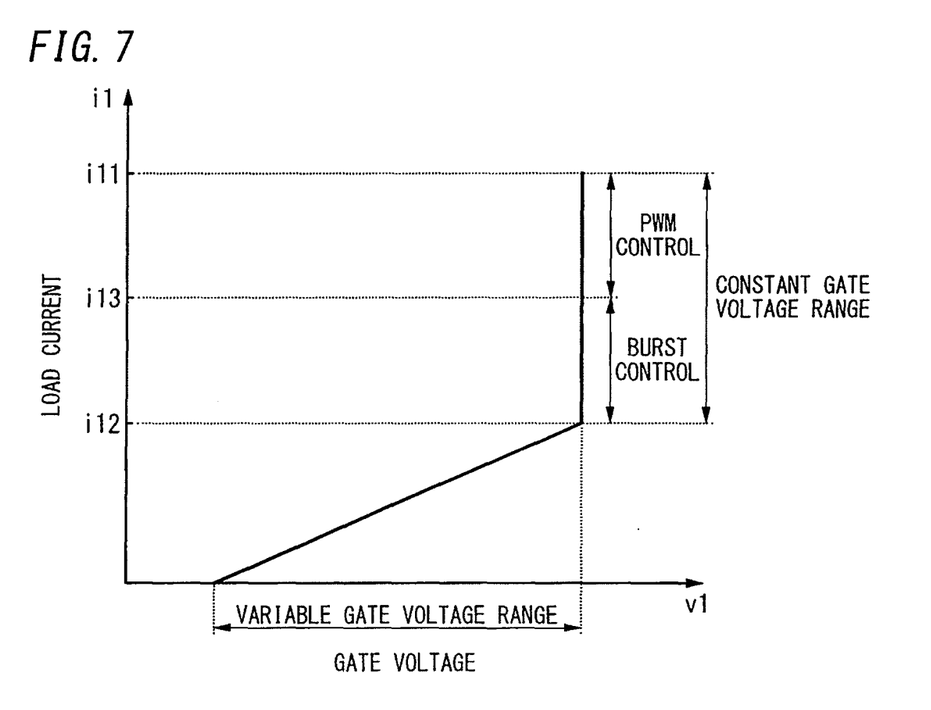
FIG. 7 is a graph illustrating a relationship between a gate voltage and a load current in a lighting device according to Third Embodiment.

FIG. 7 is a graph illustrating a relationship between a gate voltage v1 of a transistor Q2 in the current-adjusting part 12 and a load current i1 flowing through the light-emitting part 3.

From this graph, it can be seen that the gate voltage v1 is reduced with a reduction of the load current i1 in a range where a value of the load current i1 is less than "i12", and the gate voltage v1 is kept constant in a range where a value of the load current i1 is equal to or more than "i12".

Figure 8:
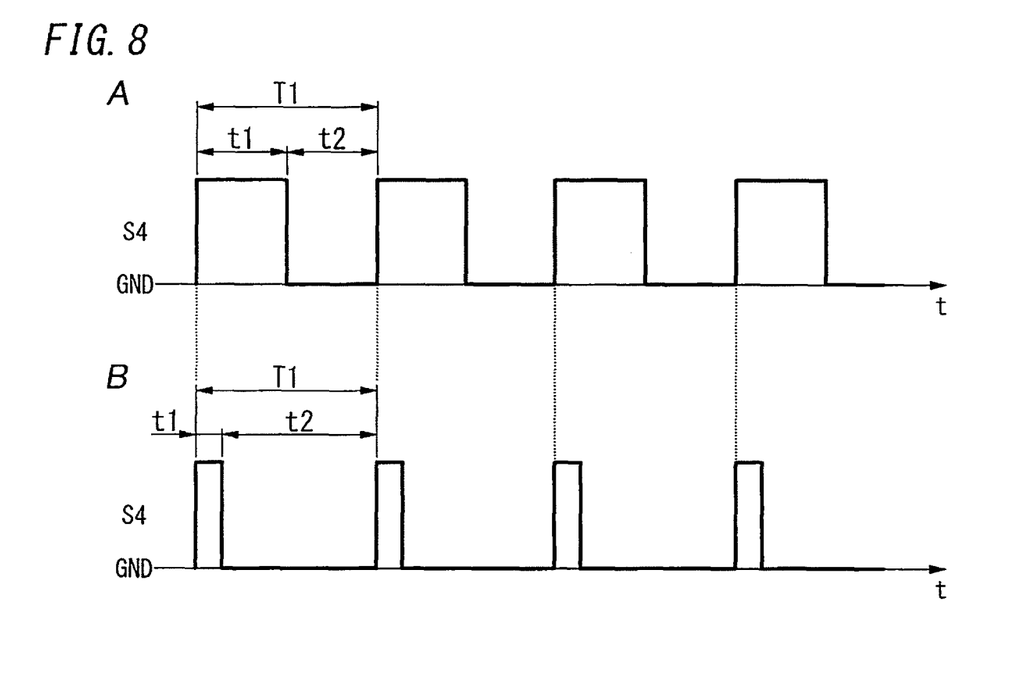
FIG. 8 is an explanatory drawing for operation of the lighting device according to the Third Embodiment.

Each of A and B in FIG. 8 shows a gate signal S4 sent to a transistor Q1 while dimming control is performed with a first control circuit 111a. When a value of the load current i1 is "i11", as shown in A of FIG. 8, a duty ratio (t1/T1) of the gate signal S4 is large. When a value of the load current i1 is "i13" (i12<i13<i11), as shown in B of FIG. 8, a duty ratio (t1/T1) of the gate signal S4 is small. In this way, it is possible to change the brightness of the light-emitting part 3 by changing the duty ratio in the gate signal S4 according to the magnitude of the load current i1.

Figure 9:
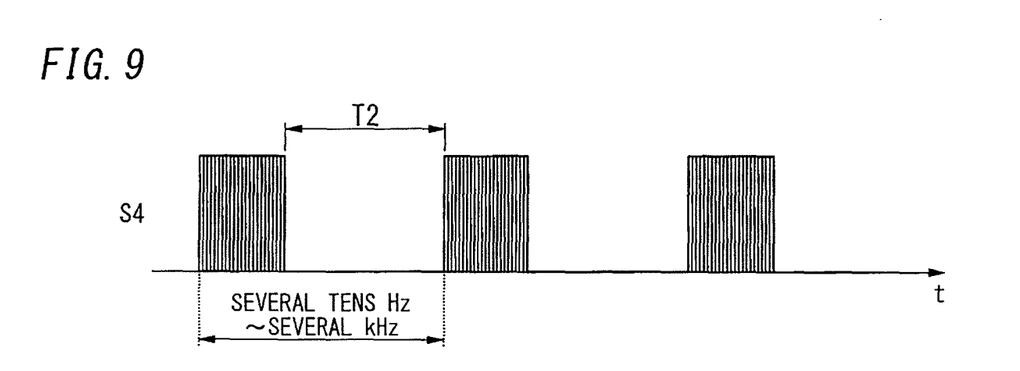
FIG. 9 is an explanatory drawing for another operation of the lighting device according to the Third Embodiment.

FIG. 9 shows the gate signal S4 sent to the transistor Q1 while the dimming control is performed with a second control circuit 111b. When a value of the load current i1 is less than "i13", the dimming control is performed with the second control circuit 111b. That is, in the present embodiment, the dimming control is performed with the first control circuit 111a in the range where a value of the load current i1 is equal to or more than "i13" and less than "i11", and the dimming control is performed with the second control circuit 111b in the range where a value of the load current i1 is equal to or more than "i12" and less than "i13".

When the luminous level according to the dimming signal S1 output from the dimmer 2 agrees with a full-lighting level, the output voltage of the DC power supply 11 is set to a rated voltage for the light-emitting part 3, and accordingly, a value of the load current i1 flowing through the light-emitting part 3 becomes "i11", and the light-emitting part 3 is fully lighted.

From this state, when a user operates the dimmer 2 to dim the light-emitting part 3, the luminous level according to the dimming signal S1 output from the dimmer 2 becomes low. When receiving the dimming signal S1 from the dimmer 2, the dimming controller 13 generates a control signal S3 for reducing the load current i1, and outputs the control signal S3 to the drive circuit 111. At this time, a control signal S2 output to the current-adjusting part 12 is constant, and accordingly, the gate voltage v1 output from the current-adjusting part 12 becomes constant.

When the drive circuit 111 receives the control signal S3 from the dimming controller 13, the first control circuit 111a reduces the duty ratio of the transistor Q1 according to the control signal S3. Accordingly, the load current i1 becomes less, and therefore, the brightness of the light-emitting part 3 becomes decreased. The above-mentioned operation is performed within the range where a value of the load current i1 is equal to or more than "i13" and less than "i11".

Next, when the user operates the dimmer 2 to more dim the light-emitting part 3, the luminous level according to the dimming signal S1 output from the dimmer 2 becomes lower. When receiving the dimming signal S1 from the dimmer 2, the dimming controller 13 generates the control signal S3 for reducing the load current i1, and outputs the control signal S3 to the drive circuit 111. At this time, the control signal S2 output to the current-adjusting part 12 is constant, and accordingly, the gate voltage v1 output from the current-adjusting part 12 becomes constant.

When the drive circuit 111 receives the control signal S3 from the dimming controller 13, the second control circuit 111b sets a suspension period for suspending the PWM control, according to the control signal S3. Accordingly, the load current i1 becomes less, and therefore, the brightness of the light-emitting part 3 becomes decreased more. The above-mentioned operation is performed within the range where a value of the load current i1 is equal to or more than "i12" and less than "i13".

Further, when the user operates the dimmer 2 to more dim the light-emitting part 3, the luminous level according to the dimming signal S1 output from the dimmer 2 becomes lower. When receiving the dimming signal S1 from the dimmer 2, the dimming controller 13 outputs the control signal S3 to the drive circuit 111. However, in this case, the dimming controller 13 outputs the control signal S3 of making a value of the load current i1 agree with "i12". The dimming controller 13 further generates the control signal S2 of reducing the gate voltage v1 of the transistor Q2, and outputs the control signal S2 to the current-adjusting part 12.

When receiving the control signal S2 from the dimming controller 13, the current-adjusting part 12 adjusts the DC voltage source 121 so that an output voltage thereof agrees with a value of the gate voltage v1 according to this control signal S2. Accordingly, the load current i1 flowing through the light-emitting part 3 becomes less, and therefore, the brightness of the light-emitting part 3 becomes decreased more. Here, in the present embodiment, the luminous level when a value of the load current i1 is "i12" is defined as a predetermined level. This predetermined level is a lower limit of the luminous level, and the lower limit is set by both of the first control circuit 111a and the second control circuit 111b.

As above, when the luminous level is equal to or more than the predetermined level, the lighting device 1 performs the dimming control with the DC power supply 11. When the luminous level is less than the predetermined level, the lighting device 1 performs the dimming control with the current-adjusting part 12 in addition to the dimming control with the DC power supply 11, namely, combination of two dimming controls. Therefore, it is possible to light the LEDs 31 at a deeper (lower) luminous level and smoothly change brightness of the LEDs 31 over a wide range.

Also in the present embodiment, instead of a flyback converter using a transformer Tr1, any one of circuits shown in FIGS. 5A to 5D may be used. In any case, the same effect can be obtained by providing the current-adjusting part 12 between the light-emitting part 3 and such a circuit. Further, also in the present embodiment, the light emitting element is not limited to the LED. For example, an organic EL element or a laser diode (LD) may be used as the light emitting element.

Furthermore, in the present embodiment, when the luminous level for the light-emitting part 3 is reduced, the PWM control with the first control circuit 111a is performed in advance. However, the burst control with the second control circuit 111b may be performed in advance, or both of the controls may be performed at the same time.

Preferably, as the above-mentioned lighting device 1 according to the present embodiment, the drive circuit 111 (voltage-adjusting part) includes at least one of the first control circuit 111a and the second control circuit 111b. The first control circuit 111a is configured to control the amplitude of the current flowing through the LEDs 31. The second control circuit 111b is configured to control the ratio of the time period of outputting the current to the time period of not outputting the current. The controller includes the current-adjusting part 12 that is configured to adjust the current by changing the magnitude of the control voltage to be applied to the gate terminal of the transistor Q2. The controller is configured, when the luminous level is equal to or more than the predetermined level, to control at least one of the first and second control circuits 111a and 111b to provide the DC voltage with the magnitude that corresponds to the luminous level, across the output ends of the DC power supply 11, in the first mode. Further, the controller is configured, when the luminous level is equal to or more than the predetermined level, to control the current-adjusting part 12 to apply the control voltage with the magnitude that is kept constant to the gate terminal of the transistor Q2, in the first mode. On the other hand, the controller is configured, when the luminous level is less than the predetermined level, to control the current-adjusting part 12 to apply the control voltage with the magnitude that corresponds to the luminous level to the gate terminal of the transistor Q2, in the second mode. Further, the controller is configured, when the luminous level is less than the predetermined level, to control at least one of the first and second control circuits 111a and 111b to provide the DC voltage with the magnitude that is kept constant, across the output ends of the DC power supply 11, in the second mode.

Preferably, as the above-mentioned lighting device 1 according to the present embodiment, the predetermined level is the lower limit of the luminous level, and the lower limit is set by both of the first control circuit 111a and the second control circuit 111b.

Fourth Embodiment

A lighting device 1 according to the present embodiment will be described with reference to FIGS. 8, 9 and 10. Because circuit configuration of the lighting device 1 is similar to that of the First Embodiment, explanation thereof will be basically omitted here and described with reference to FIG. 1 if necessary.

As shown in FIG. 1, the lighting device 1 according to the present embodiment includes a DC power supply 11, a current-adjusting part 12 and a dimming controller 13. The lighting device 1 is configured to light a light-emitting part 3 at a luminous level according to a dimming signal S1 that is output from a dimmer 2.

Next, operation of the lighting device 1 will be described with reference to FIGS. 8, 9 and 10.

Figure 10:
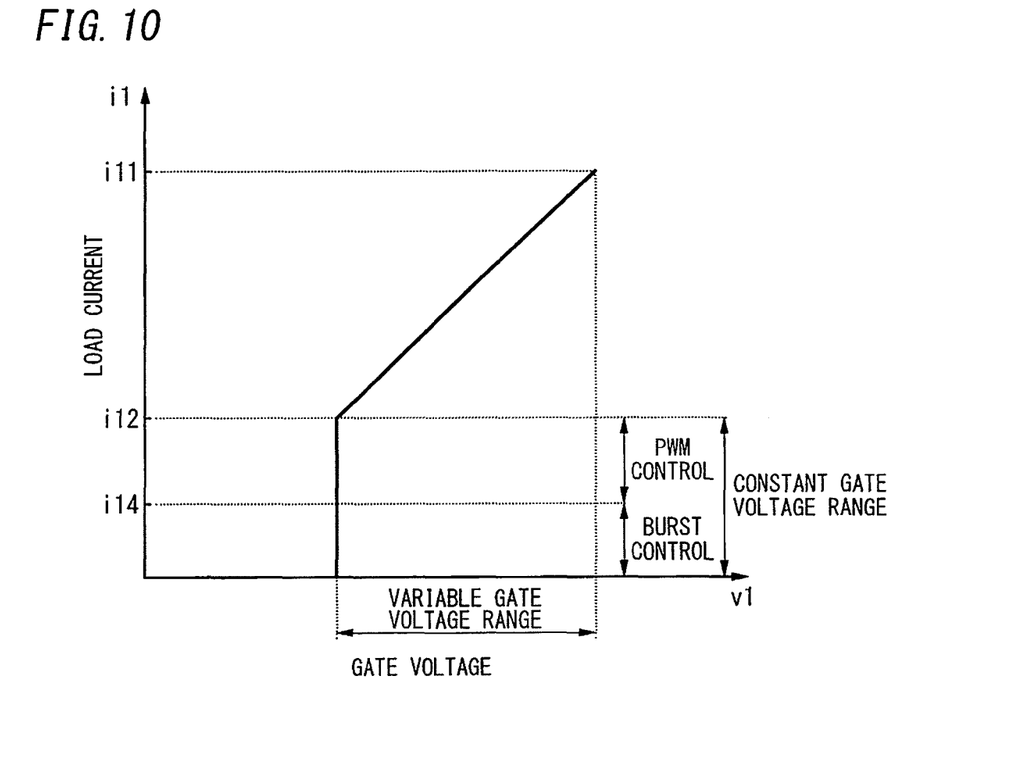
FIG. 10 is a graph illustrating a relationship between a gate voltage and a load current in a lighting device according to Fourth Embodiment.

FIG. 10 is a graph illustrating a relationship between a gate voltage v1 of a transistor Q2 in the current-adjusting part 12 and a load current i1 flowing through the light-emitting part 3. From this graph, it can be seen that the gate voltage v1 is reduced with a reduction of the load current i1 in a range where a value of the load current i1 is equal to or more than "i12", and the gate voltage v1 is kept constant in a range where a value of the load current i1 is less than "i12".

Each of A and B in FIG. 8 shows a gate signal S4 sent to a transistor Q1 while dimming control is performed with a first control circuit 111a. When the load current i1 is large, as shown in A of FIG. 8, a duty ratio (t1/T1) of the gate signal S4 is large. When the load current i1 is small, as shown in B of FIG. 8, a duty ratio (urn) of the gate signal S4 is small. In this way, it is possible to change the brightness of the light-emitting part 3 by changing the duty ratio in the gate signal S4 according to the magnitude of the load current i1.

FIG. 9 shows the gate signal S4 sent to the transistor Q1 while the dimming control is performed with a second control circuit 111b. When a value of the load current i1 is less than "i14" (<i12), the dimming control is performed with the second control circuit 111b. That is, in the present embodiment, the dimming control is performed with the first control circuit 111a in the range where a value of the load current i1 is equal to or more than "i14" and less than "i12", and the dimming control is performed with the second control circuit 111b in the range where a value of the load current i1 is less than "i14".

When the luminous level according to the dimming signal S1 output from the dimmer 2 agrees with a full-lighting level, the output voltage of the DC power supply 11 is set to a rated voltage for the light-emitting part 3, and accordingly, a value of the load current i1 flowing through the light-emitting part 3 becomes "i11", and the light-emitting part 3 is fully lighted.

From this state, when a user operates the dimmer 2 to dim the light-emitting part 3, the luminous level according to the dimming signal S1 output from the dimmer 2 becomes low. When receiving the dimming signal S1 from the dimmer 2, the dimming controller 13 generates a control signal S2 for reducing the gate voltage v1 of the transistor Q2, and outputs the control signal S2 to the current-adjusting part 12. In a range where a value of the load current i1 is equal to or more than "i12" and less than "i11", a control signal S3 that is output to the DC power supply 11 is set to be equal to the control signal S3 upon the full-lighting.

When receiving the control signal S2 from the dimming controller 13, the current-adjusting part 12 adjusts the DC voltage source 121 so that an output voltage thereof agrees with a value of the gate voltage v1 according to the control signal S2. Accordingly, the load current i1 flowing through the light-emitting part 3 becomes less, and therefore, the brightness of the light-emitting part 3 becomes decreased. The above-mentioned operation is performed within the range where a value of the load current i1 is equal to or more than "i12" and less than "i11".

Next, when the user operates the dimmer 2 to more dim the light-emitting part 3, the luminous level according to the dimming signal S1 output from the dimmer 2 becomes lower. When receiving the dimming signal S1 from the dimmer 2, the dimming controller 13 outputs the control signal S2 to the current-adjusting part 12. However, in this case, the dimming controller 13 outputs the control signal S2 of making a value of the load current i1 agree with "i12". Therefore, as shown in FIG. 10, the gate voltage v1 become constant. The dimming controller 13 further generates the control signal S3 of reducing the load current i1, and outputs the control signal S3 to a drive circuit 111.

When the drive circuit 111 receives the control signal S3 from the dimming controller 13, the first control circuit 111a reduces the duty ratio of the transistor Q1 according to the control signal S3. Accordingly, the load current i1 becomes less, and therefore, the brightness of the light-emitting part 3 becomes decreased more. The above-mentioned operation is performed within the range where a value of the load current i1 is equal to or more than "i14" and less than "i12".

Further, when the user operates the dimmer 2 to more dim the light-emitting part 3, the luminous level according to the dimming signal S1 output from the dimmer 2 becomes lower. When receiving the dimming signal S1 from the dimmer 2, the dimming controller 13 outputs the control signal S2 to the current-adjusting part 12. However, in this case, the dimming controller 13 outputs the control signal S2 of making a value of the load current i1 agree with "i12". Therefore, as shown in FIG. 10, the gate voltage v1 become constant. The dimming controller 13 further generates the control signal S3 of reducing the load current i1, and outputs the control signal S3 to the drive circuit 111.

When the drive circuit 111 receives the control signal S3 from the dimming controller 13, the second control circuit 111b sets a suspension period for suspending the PWM control, according to the control signal S3. Accordingly, the load current i1 becomes less, and therefore, the brightness of the light-emitting part 3 becomes decreased more. Here, in the present embodiment, the luminous level when a value of the load current i1 is "i12" is defined as a predetermined level.

As above, when the luminous level is equal to or more than the predetermined level, the lighting device 1 performs the dimming control with the current-adjusting part 12. When the luminous level is less than the predetermined level, the lighting device 1 performs the dimming control with the DC power supply 11 in addition to the dimming control with the current-adjusting part 12, namely, combination of two dimming controls. Therefore, it is possible to light the LEDs 31 at a deeper (lower) luminous level and smoothly change brightness of the LEDs 31 over a wide range.

Also in the present embodiment, instead of a flyback converter using a transformer Tr1, any one of circuits shown in FIGS. 5A to 5D may be used. In any case, the same effect can be obtained by providing the current-adjusting part 12 between the light-emitting part 3 and such a circuit. Further, also in the present embodiment, the light emitting element is not limited to the LED. For example, an organic EL element or a laser diode (LD) may be used as the light emitting element.

Furthermore, in the present embodiment, when the luminous level for the light-emitting part 3 is reduced, the PWM control with the first control circuit 111a is performed in advance. However, the burst control with the second control circuit 111b may be performed in advance, or both of the controls may be performed at the same time.

Preferably, as the above-mentioned lighting device 1 according to the present embodiment, the drive circuit 111 (voltage-adjusting part) includes at least one of the first control circuit 111a and the second control circuit 111b. The first control circuit 111a is configured to control the amplitude of the current flowing through the LEDs 31. The second control circuit 111b is configured to control the ratio of the time period of outputting the current to the time period of not outputting the current. The controller includes the current-adjusting part 12 that is configured to adjust the current by changing the magnitude of the control voltage to be applied to the gate terminal of the transistor Q2. The controller is configured, when the luminous level is equal to or more than the predetermined level, to control the current-adjusting part 12 to apply the control voltage with the magnitude that corresponds to the luminous level to the gate terminal of the transistor Q2, in the second mode. Further, the controller is configured, when the luminous level is equal to or more than the predetermined level, to control at least one of the first and second control circuits 111a and 111b to provide the DC voltage with the magnitude that is kept constant, across the output ends of the DC power supply 11, in the second mode. On the other hand, the controller is configured, when the luminous level is less than the predetermined level, to control at least one of the first and second control circuits 111a and 111b to provide the DC voltage with the magnitude that corresponds to the luminous level, across the output ends of the DC power supply 11, in the first mode. Further, the controller is configured, when the luminous level is less than the predetermined level, to control the current-adjusting part 12 to apply the control voltage with the magnitude that is kept constant to the gate terminal of the transistor Q2, in the first mode.

Fifth Embodiment

Figure 11:
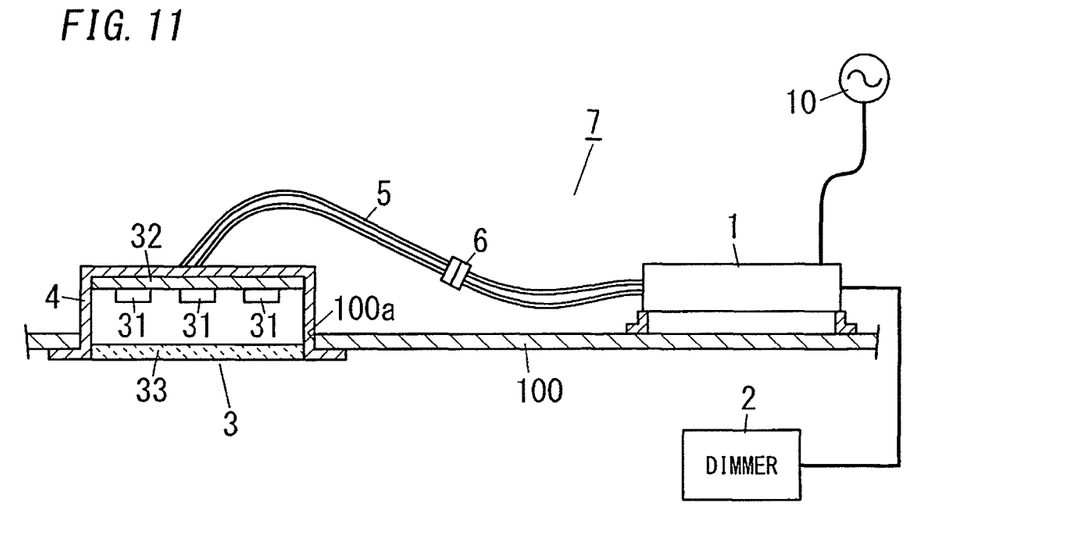
FIG. 11 is a cross section view of an illumination apparatus, in an installed state, using the lighting device according to any one of the First to Fourth Embodiments.

An illumination apparatus 7 according to the present embodiment will be described with reference to FIG. 11. FIG. 11 is a cross section view of the illumination apparatus 7, in an installed state, according to the present embodiment. This illumination apparatus 7 includes: the lighting device 1 according to any one of the above-mentioned First to Fourth Embodiments; a light-emitting part 3; and a main body 4 of the apparatus. The lighting device 1 is connected to a dimmer 2 via a cable, and is configured to light the light-emitting part 3 at a luminous level according to a dimming signal S1 that is output from the dimmer 2.

The main body 4 is an aluminum die-cast product for example, and is formed into a bottomed cylindrical shape, and one surface thereof (a lower surface in FIG. 11) is opened. The main body 4 is embedded in a ceiling through an embedded hole 100a which is provided in a ceiling material 100. The main body 4 houses a substrate 32 on which a plurality of LEDs 31 are mounted (three LEDs in FIG. 11). At an opening end of the main body 4, a light diffusing plate 33 is attached for diffusing light emitted from the LEDs 31. In the present embodiment, the substrate 32, on which the LEDs 31 are mounted, and the light diffusing plate 33 constitute the light-emitting part 3.

As shown in FIG. 11, in the illumination apparatus 7 according to the present embodiment, the lighting device 1 and the main body 4 housing the light-emitting part 3 are installed at a certain interval. The light-emitting part 3 is electrically connected to the lighting device 1 through power lines 5 that are connected to each other via a connector 6. In this way, when the lighting device 1 is installed to be separated from the main body 4, the main body 4 is required to house only the light-emitting part 3. Therefore, it is possible to reduce the height dimension of the main body 4, and further improve flexibility regarding installation of the lighting device 1.

As above, it is possible to provide the illumination apparatus 7, which can light the light-emitting part 3 at a deeper (lower) luminous level, and smoothly change brightness of the light-emitting part 3 over a wide range, by using the lighting device 1 according to any one of the First to Fourth Embodiments.

In the present embodiment, the lighting device 1 is installed to be separated from the main body 4. However, the lighting device 1 may be installed integrally with the main body 4. In the present embodiment, the wired dimmer 2 is used. However, a wireless dimmer may be used, which can communicate with the lighting device 1 by infrared rays, electric waves or the like. That is, the dimmer 2 is not limited to the wired type as the present embodiment.

As described above, the illumination apparatus 7 according to the present embodiment includes the lighting device 1 and the light-emitting part 3 including at least one LED 31 (light emitting element). The light-emitting part 3 is lighted by electric power supplied from the lighting device 1.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A lighting device, comprising:
a DC power supply comprising a voltage-adjusting part that is configured to adjust a magnitude of a DC voltage, the DC power supply being configured to provide, across output ends thereof, the DC voltage adjusted by the voltage-adjusting part;
a switching element connected in series with at least one light emitting element across the output ends of the DC power supply, the switching element including a control terminal, and being configured to adjust a current flowing through the at least one light emitting element according to a magnitude of a control voltage that is applied to the control terminal; and
a controller having a first mode and a second mode,
the first mode being, when receiving a dimming instruction signal of setting a luminous level for the at least one light emitting element, of
controlling the voltage-adjusting part to provide the DC voltage with a magnitude that corresponds to the luminous level, across the output ends of the DC power supply; and
applying the control voltage with a magnitude that is kept constant to the control terminal of the switching element,
the second mode being, when receiving the dimming instruction signal, of:
applying the control voltage with a magnitude that corresponds to the luminous level to the control terminal of the switching element; and
controlling the voltage-adjusting part to provide the DC voltage with a magnitude that is kept constant, across the output ends of the DC power supply,
the controller being configured to operate in one of the first and second modes, when the luminous level is a predetermined level or more,
the controller being configured to operate in an other of the first and second modes, when the luminous level is less than the predetermined level.

2. The lighting device according to claim 1,
wherein the voltage-adjusting part comprises at least one of a first control circuit and a second control circuit, the first control circuit being configured to control an amplitude of the current, the second control circuit being configured to control a ratio of a time period of outputting the current to a time period of not outputting the current, and
wherein the controller comprises a current-adjusting part that is configured to adjust the current by changing the magnitude of the control voltage to be applied to the control terminal of the switching element,
the controller being configured, when the luminous level is equal to or more than the predetermined level, to control at least one of the first and second control circuits to provide the DC voltage with the magnitude that corresponds to the luminous level, across the output ends of the DC power supply, and control the current-adjusting part to apply the control voltage with the magnitude that is kept constant to the control terminal of the switching element, in the first mode,
the controller being configured, when the luminous level is less than the predetermined level, to control the current-adjusting part to apply the control voltage with the magnitude that corresponds to the luminous level to the control terminal of the switching element, and control at least one of the first and second control circuits to provide the DC voltage with the magnitude that is kept constant, across the output ends of the DC power supply, in the second mode.

3. The lighting device according to claim 2,
wherein the predetermined level is a lower limit of the luminous level, the lower limit being set by both of the first and second control circuits.

4. The lighting device according to claim 2,
wherein the predetermined level is a lower limit of the luminous level, the lower limit being set by the first control circuit.

5. The lighting device according to claim 1,
wherein the voltage-adjusting part comprises at least one of a first control circuit and a second control circuit, the first control circuit being configured to control an amplitude of the current, the second control circuit being configured to control a ratio of a time period of outputting the current to a time period of not outputting the current, and
wherein the controller comprises a current-adjusting part that is configured to adjust the current by changing the magnitude of the control voltage to be applied to the control terminal of the switching element,
the controller being configured, when the luminous level is equal to or more than the predetermined level, to control the current-adjusting part to apply the control voltage with the magnitude that corresponds to the luminous level to the control terminal of the switching element, and control at least one of the first and second control circuits to provide the DC voltage with the magnitude that is kept constant, across the output ends of the DC power supply, in the second mode,
the controller being configured, when the luminous level is less than the predetermined level, to control at least one of the first and second control circuits to provide the DC voltage with the magnitude that corresponds to the luminous level, across the output ends of the DC power supply, and control the current-adjusting part to apply the control voltage with the magnitude that is kept constant to the control terminal of the switching element, in the first mode.

6. An illumination apparatus, comprising:
the lighting device according to claim 1; and
a light-emitting part including the at least one light emitting element, the light-emitting part being lighted by electric power supplied from the lighting device.

7. An illumination apparatus, comprising:
the lighting device according to claim 2; and
a light-emitting part including the at least one light emitting element, the light-emitting part being lighted by electric power supplied from the lighting device.

8. An illumination apparatus, comprising:
the lighting device according to claim 3; and
a light-emitting part including the at least one light emitting element, the light-emitting part being lighted by electric power supplied from the lighting device.

9. An illumination apparatus, comprising:
the lighting device according to claim 4; and
a light-emitting part including the at least one light emitting element, the light-emitting part being lighted by electric power supplied from the lighting device.

10. An illumination apparatus, comprising:
the lighting device according to claim 5; and
a light-emitting part including the at least one light emitting element, the light-emitting part being lighted by electric power supplied from the lighting device.

* * * * *